Figure 1:
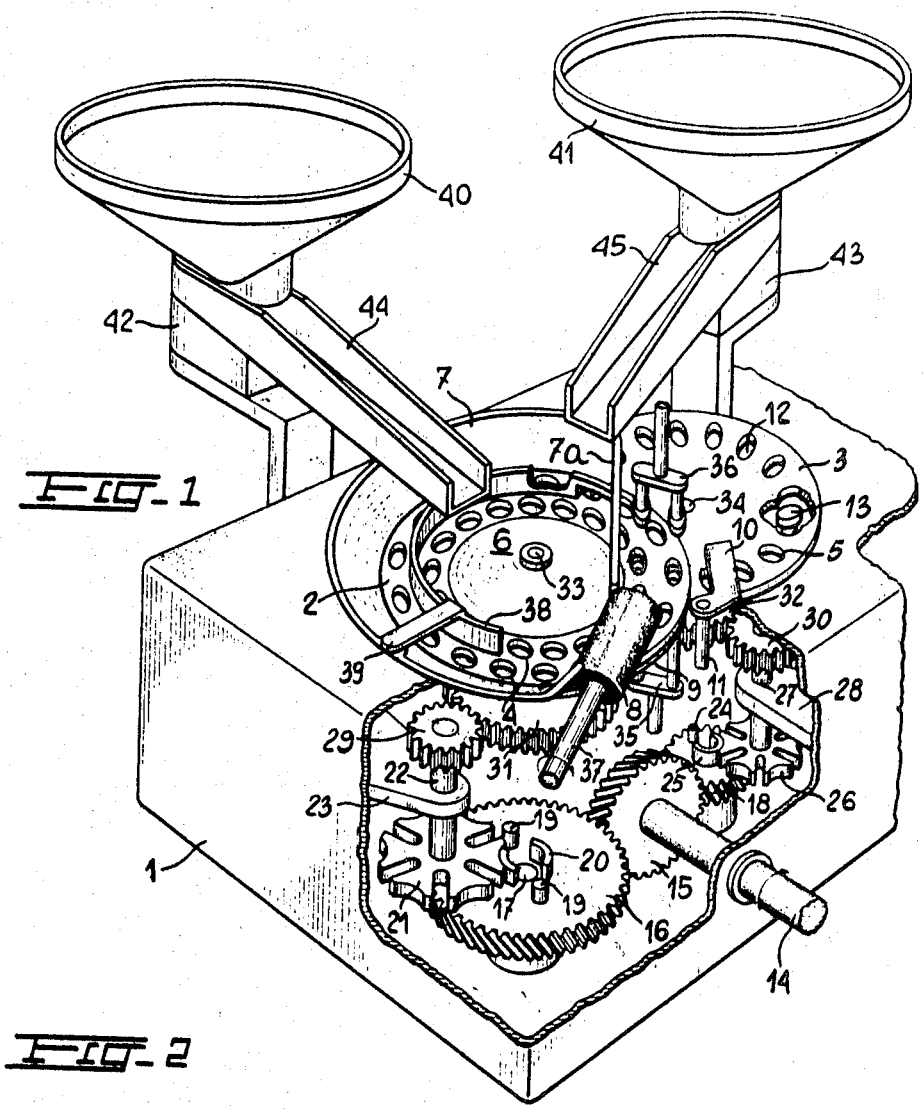

United States Patent

[11] 3,625,337

[72] Inventor Ariosto Seragnoli
 Via Bollinzona, 31 Bologna, Italy
[21] Appl. No. 811,423
[22] Filed Mar. 28, 1969
[45] Patented Dec. 7, 1971
[32] Priority Apr. 3, 1968
[33] Italy
[31] 1588A/68

[54] DEVICE FOR COORDINATING AND SEPARATELY SUPPLYING OBJECTS WRAPPING MACHINE
6 Claims, 2 Drawing Figs.

[52] U.S. Cl. ................................................. 198/32
[51] Int. Cl. ................................................. B65g 47/26
[50] Field of Search ........................................ 221/162,
 265, 167–169, 173, 156; 198/25, 209, 32, 30

[56] References Cited
UNITED STATES PATENTS
3,500,981  3/1970  Yann ............................ 198/30
2,859,855  11/1958  Grafingholt ................. 198/209 X Primary Examiner—Stanley H. Tollberg
Attorneys—Robert E. Burns and Emmanuel J. Lobato ABSTRACT: A device for coordinating and separately supplying objects, such as sugar-drops and the like, to a paper-wrapping machine, is described as having intermittently moving dispensing means acting as a bottom for a container provided with holes each for receiving an object, with intermittently moving conveyor means, provided with holes and by partial overlapping said dispensing means for receiving the objects therefrom and supply the same to the paper-wrapping machine, the holes in said dispenser means being arranged in sets and the intermittent movement of the dispensing means being coordinated with the holes and intermittent movement of the conveyor means, so that at each transfer step a plurality of objects in the individual holes of said plurality of hole sets in the dispensing means pass to as many individual subsequent holes in the conveyor means, the sets of holes in the dispensing means being separated from one another by a stationary wall concentrically disposed there between which is interrupted in the area comprising the transfer station.

PATENTED DEC 7 1971　　　　　　　　　　　　　　　3,625,337

DEVICE FOR COORDINATING AND SEPARATELY SUPPLYING OBJECTS WRAPPING MACHINE

The present invention relates to devices for coordinating and separately supplying objects particularly sugar-drops and the like, to a paper-wrapping machine.

In order to coordinate and separately supply objects particularly sugar-drops and the like, to a paper-wrapping machine, there have been for a long time known devices comprising an intermittently rotating disc, partially or wholly overhung by a stationary enclosure defining a moving bottom for bulk loading the articles to be coordinated and at the periphery thereof provided with annularly disposed holes, each of which being arranged to receive and accommodate an object to be supplied to the paper-wrapping machine.

Normally, supply of objects within holes to the paper-wrapping machine is accomplished by a reciprocating member, which sequentially withdraws these articles from the holes during rotation of the disc and supplies the same to the wrapping wheel of the machine, along with wrapping materials in sheets subsequently fed by also known means.

When elongated articles, such as oval or rectangle articles, to be wrapped up are fed by such known devices and such wrappings as the so-called tip, or simple, or double knot type are desired to be carried out with the wrapping material being twisted at the end or the ends of the article length, it is desirable for the sake of rapidity that the holes in the rotating disc be radially arranged.

But since, as is well known, elongated articles would tend, upon movement of the rotating disc, to arrange themselves tangentially on the disc, that is at right angles to the radius and hence to the axis of the radial holes, and since, it is not as easy, when the disc moves, to mechanically rather than manually fill radially arranged holes, as it is when the holes are tangentially arranged, it has been suggested to use for this purpose a device having two rotating and partially superimposed release discs. One of these, referred to as the "distributor," has tangentially arranged elongated peripheral holes for coordinating the articles, and the other or "conveyor" has radially arranged elongated peripheral holes for supplying the individual articles to the paper-wrapping machine. These discs are so arranged that the tangential holes in the distributor disc are individually and subsequently vertically aligned with the individual radial holes in the conveyor disc at a transfer station when said discs are still, so that an article can be transferred from its tangential hole in the distributor disc to the radial hole in the conveyor disc to be fed at another station, and during the next stop of the discs, to the paper-wrapping machine.

However, as is well known, these devices can operate satisfactorily only as a certain speed, approximately corresponding to 200-250 wrappings per minute, thus limiting the speed at which the paper-wrapping machine can normally operate.

This speed limit is due to the face that when the disc or discs, when rotating at a speed tending to exceed said wrapping limits per time unit, because of the resulting decrease in stationary time of the disc or discs and the sudden movements thereof, the articles will fail to enter or suitably fit within the holes, or will irregularly be arranged therein thus causing voids in the article supply line to the paper-wrapping machine, which is to be manually or mechanically integrated, or obstructs the transfer thereof with a resulting damage to the articles to be wrapped up.

In order to exceed the above-mentioned wrapping limits per unit time, a device has been proposed, having a distributing or dispensing member movable along an endless path and provided with a plurality of set holes, each of which during the movement of said dispensing member and by means of pressure means, such as brush means, are entered by one of the articles continuously fed on said dispensing member. The holes in each set of said dispensing member are so arranged as to be, at some location in the path of said dispensing member, each above a hole of the same number of holes of a stationary element forming part of a conveyor device comprising a plurality of such elements.

These elements forming the conveyor device are so coordinated that as one of them is stationary to receive by drop within its own holes the articles contained in a set of holes of the dispensing member, the other elements are advanced through a continuous movement along an endless path so as to be alternately sequentially carried to this stop position to subsequently receive individual sets of articles from the dispensing member, and then are advanced again along said endless path. The articles thus transferred to the next conveyor elements are subsequently withdrawn by coordinated means, so as to follow the movement of said conveyor elements, and are then supplied to the paper-wrapping machine.

The problem of increasing the wrappings per unit time can be solved in a distinctly simpler manner, firstly by associating the ordinary intermittently moving member (such as a disc having a ring of peripheral holes, or a chain having longitudinally spaced apart holes), and this serving as a conveyor, with dispersing means, also provided with intermittent movement and comprising a plurality of auxiliary discs, each fitted with annularly disposed peripheral holes, or a single auxiliary disc having a plurality of concentric rings of peripheral holes, capable of supplying articles to a plurality of holes in said conveyor member during stoppage in relation superimposed of conveyor member and dispensing means (in accordance with applicant's Italian Pat. Nos. 549,176, 554,081, 588,746 and 618,488,) by coupling an also intermittently moving dispensing means to the ordinary intermittently moving conveyor member, but coordinating such intermittent movements according to different motion laws for each intermittent period (stop and go) so as to obtain stoppage in superimposed relation with vertical register of respective holes and to allot movement and stop times to the dispensing means sufficient to ensure that the articles will enter the holes and sufficient stationary time to the conveyor member to accomplish the removal operations therefrom and supply articles to the paper-wrapping machine.

In practice, the devices according to patents above have made it possible to double the unit output by increasing the amount of wrappings per minute from 200-250 on conventional machines, as above noted, to 400-500.

The devices of the above-mentioned patents, further increased the unitary output of these paper-wrapping machines, doubling the previously mentioned figure of 400-500 wrappings per minute, thus attaining an output which may reach 800-1,000 wrappings per minute, and even more.

This was achieved by coordinating the entry of the articles to be supplied in the dispensing disc holes, and in operating the device according to Italian Pat. No. 554,018, with the combination of the ordinary conveyor disc having a single ring of peripheral holes with the dispensing means, for example with the disc having two concentric rings of peripheral holes, by the device according to Italian Pat. Nos. 588,746 and 618,488 which is intended to coordinate the intermittent movements of the conveyor and dispensing discs, according to movements as above mentioned.

The difficulties encountered in setting up this device substantially resulted in that, owing to the different peripheral speeds in the two concentric rings of peripheral holes in the dispensing disc, the above-mentioned ideal conditions of article adjustment within the peripheral holes were provided only for either hole ring depending on the time as taken for each intermittency (stop and go), thus producing voids in the holes with resulting detriment to the normal operation of the machine, as found and above mentioned for known single supply disc machines.

Therefore, the main object of the present invention is to overcome the above-mentioned problems by providing the same operative conditions for the articles as supplied in bulk to the dispensing disc in connection with the concentric rings of holes, relatively to the capability of the individual articles to fit within the holes of the respective hole ring.

A further object of the present invention is to bring about said operative conditions in function of the reception of the articles within the holes, by providing for each annular hole in the dispensing disc a corresponding flow channel for the articles to be supplied.

A still further object of the invention is to contemplate that at some location in the path thereof said channels be interconnected to allow for article transfer from one to another channel.

A further object of the present invention is also to provide that, in accordance with the above-mentioned requirements of mechanically fitting the elongated articles within the dispensing disc holes and withdrawing said articles from the conveyor disc for supply thereof to the wrapping up members of the machine, such holes be arranged lengthwise substantially tangentially extending in said dispensing disc, i.e., at right angles to the disc radius through the middle longitudinal point of the corresponding hole, and substantially radially longitudinally extending in said conveyor disc.

Finally, a further object of the invention is to provide a device for attaining all of the above objects by a particularly easy, simple and reliable structure, at a comparatively low cost as compared with the substantial performance provided thereby.

These and still further objects are all attained by the device according to the invention for coordinating and separately supplying articles, particularly sugar-drops and the like, to a type of paper-wrapping machine comprising an intermittently dispensing means acting as a bottom for a container of bulk loading and provided with holes each for accommodating an article, and a conveyor means, which is also intermittently movable and provided with holes, associated by partial superimposition with said dispensing means to receive the articles therefrom and to supply such articles to the paper-wrapping machine, the holes and intermittent movement of the dispensing means being arranged to a plurality of series and, respectively, coordinated with the holes and intermittent movement of the conveyor means, so that at each transfer step a plurality of articles in the individual holes of said plurality of hole sets in the dispensing means pass to as many individual subsequent or adjacent holes in the conveyor means, the device being characterized in that said hole sets in said dispensing means are separated from one another by a stationary wall.

According to a further useful feature of the invention, said stationary wall is contemplated as interrupted for some length at an area comprising the article transfer station from the dispensing means to the conveyor means, to allow for transferring the articles from one to another area of said dispensing means being involved by the respective hole set.

Advantageously, both the dispensing and conveyor means are each provided with a corresponding disc having two and one ring of peripheral holes, respectively. In this case, the stationary wall associated with the dispensing disc is of cylindrical concentric intermediate configuration with the two rings of holes. Thus, it is apparent that by using a single dispensing disc, the same operative conditions are attained as achievable by using a pair of dispensing discs having a single-hole ring. Further, it is also contemplated that the elongated contour holes for correspondingly shaped articles be provided for the dispensing disc as substantially tangentially longitudinally extending, i.e., at right angles to the disc radius through the middle longitudinal point of the respective hole, whereas in the conveyor disc such holes are provided as substantially radially longitudinally extending.

Figure 2:
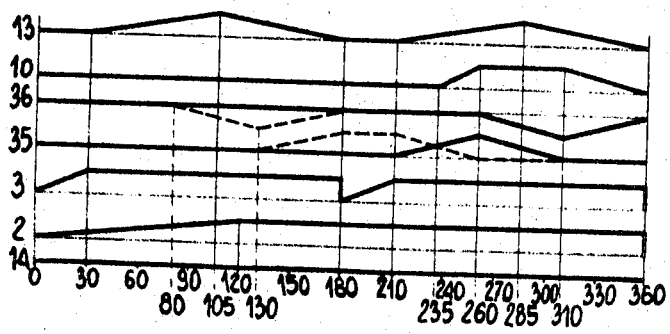

Further features and advantages of the invention will be more apparent from the following detailed description of a preferred but not exclusive embodiment of the invention device, shown by way of nonrestrictive example in the accompanying drawings in which:

FIG. 1 is a perspective view showing the device with some portions being cut away and broken away for better displaying other portions; and FIG. 2 shows a diagram of the operative steps in a machine cycle for the moving elements being involved in article coordination, transfer and transport.

From FIG. 1 it will be seen that the device comprises a base 1, associable in a known manner with, or forming part of the base of the paper-wrapping machine, the latter not being involved by the present invention.

Said base 1 carries in a known manner, not shown in the drawing, the discs 2 and 3 rotatable as shown in the applicatn's above-mentioned Italian Pat. Nos. 588,746 and 618,488 and driven by means to be more particularly described hereinafter.

These rotatable discs are horizontally arranged so that disc 2 will partially overlap disc 3, but in practice disc 3 could as well overlap disc 2, without the operating conditions being impaired, as explained below.

Moreover, disc 2 is provided with two sets of holes 4 arranged in two peripheral rings concentric with the disc which, as disclosed below, acts as a dispensing disc, whereas disc 3 is provided with a single set of holes 5 arranged in a peripheral ring concentric with the disc, this acting as a conveyor disc. The holes in the discs are designed for elongated products and, therefore, are similarly conformed, the advantageous disposition for dispensing disc 2 being according to a substantial tangential longitudinal extension and for conveyor disc 3 according to a substantial radial longitudinal extension.

Said disc 2 also has a central slightly convex area 6 and is enclosed by a length of stationary wall 7 in a hopper fashion having a wall length 7a so as to form in conjunction with a rotating brush 8, to be better described hereinafter, a basin for article bulk loading excluding the peripheral area of said disc 2, involved by the hole rings, and which will gradually overlap disc 3. Underneath holes 4 in disc 2, there is provided a stationary plane 9, extending counterclockwise from wall length 7a to the location where overlapping of disc 3 commences.

A plate 10 mounted in known manner on a driven axis 11, is designed to take two positions, one of which being shown by dashed lines, between the two discs as an extension of said last-mentioned terminal end of stationary plane 9, and other, as shown by full lines, out of the area being involved by disc 2.

A stationary plane 12 is also provided beneath holes 5 in disc 3 in an area extending clockwise from a location adjacent plate 10, when at said position as shown by thin lines, to adjacent a station where a member 13 is provided, this member 13 reciprocably operating to supply the articles thereto conveyed by said disc 3 in a known manner to the wrapping members of the machine.

As above mentioned, the dispensing disc 2 and conveyor disc 3 are driven by intermittent rotating movement according to different motion laws, in accordance with the aforecited Italian Pat. Nos. 588,746 and 618,488, whereas the intermittencies (stop and go) can also be provided in accordance with other cited Italian Pat. Nos. 549,176 and 554,018. 018.

In the present exemplary embodiments, this is achieved through drive shaft 14 which is independently driven or driven by the paper-wrapping machine in a known manner. It is conventionally assumed that each revolution of this shaft 14 would correspond to a machine cycle, or a machine cycle would thus correspond to a rotation of said shaft 14 through 360°, as shown at the bottom of the exemplary diagram in FIG. 1.

Therefore, at each machine cycle, or at each revolution of said shaft 14, the dispensing disc 2 will move, in one or more stages in accordance with the applicant's above-mentioned corresponding patents, through one step corresponding to an angular excursion equivalent to the angle between subsequent holes in the corresponding concentric hole rings, whereas conveyor disc 3 will move through two steps, each of which corresponding to an angular excursion equivalent to the angle between two of its adjacent holes. Thus, owing to the arrangement of the respective holes in the two partially superimposed discs, it is apparent that at each machine cycle two holes in the dispensing disc 2, one for each ring of holes, will overlap as many subsequent holes in the conveyor disc 3, which at each machine cycle is thus supplied with a plurality of articles to be transferred to the paper-wrapping machine supply station by said member 13.

A gear 15 is keyed on said shaft 14 and meshes with a gear 16 rotatable about axis 17 and a gear 18 rotatable about a corresponding axis (not shown), said axes being supported by base 1 in a known manner.

The ratios for the three gears 15, 16 and 18 are selected to be 1:1, 2:1 and 1:2 respectively, or gear 16 having twice a number of teeth with respect to gear 15 and gear 18 having half a number of teeth with respect to the same gear 15. Therefore, it is thus evident that at each revolution of shaft 14, and hence gear 15, there will correspond half a revolution of gear 16 and two revolutions of gear 18.

Two diametrically located pins 19 are associated with gear 16, while on the diameter normal to the diameter of said pins 19 two arcuate or centering sectors 20 are provided. Pins 19 and centering elements 20 are intended to operate on a maltese cross 21 shaped device for rotation thereof about axis 22 carried by support 23 of base 1. A single pin 24 and a single centering element 25 are associated, instead, with gear 18, such members being intended to operate on maltese cross 26 for rotation thereof about axis 27 carried by support 28 of base 1.

Thus, at each revolution of shaft 14, and hence gear 15, due to the resulting half revolution of gear 16, said maltese cross 21 will be rotated by one of its pins 19 through one-sixth of a revolution, i.e. one step, whereas, due to the resulting two revolutions of gear 18, said maltese cross 26 will be twice rotated by pin 24, i.e. through one-sixth revolution each time, or through two steps.

A gear 29, 30 is respectively associated with shafts 22 and 27 of maltese crosses 21 and 26. These gears 29 and 30 mesh with respective gears 31 and 32, keyed on the rotation shafts 22 and 34 of discs 2 and 3, respectively. The ratios of gear pairs 29–31 and 30–32 are such that at each angular excursion of gear 29 corresponding to one step of maltese cross 21, the dispensing disc 2 is advanced through an angle between two subsequent holes of its two concentric hole rings, i.e. through one step, whereas, because of the two revolutions of gear 18 and two steps of maltese cross 26, the conveyor disc 3 is rotated also through two steps.

Thus, it is apparent that at each machine cycle said dispensing disc 2 will move through one step, whereas said conveyor disc 3 will move through two steps, so that two holes, one for each hole ring in said disc 2 will overlap two adjacent holes in disc 3 (FIG. 1).

At the region of said overlapping holes of the two discs, such a location being referred to as a transfer station for the articles from one to the other disc, there are provided the usual transferring members 35 and 36, oppositely reciprocably operating and driven as already known for such machines. Also the movement of brush 8 is achieved through its shaft 37 as already known for these paper-wrapping machines.

In order to overcome the aforesaid different peripheral speed at the annular areas involved by the respective hole rings in dispensing disc 2 and to enable the supplying articles to conveniently arrange within the holes of either ring of said holes, there is provided according to the invention a stationary wall 38 cylindrically extending concentric with, and intermediately arranged to said concentric rings of holes. As a whole, this stationary wall 38 is associated by known fastening means, such as connection element 39, with the outer stationary wall 7.

Conveniently, this cylindrical stationary wall 38 is also contemplated as interrupted or broken away (FIG. 1) at areas upstream and downstream of brush 8 to allow for article transferring from one to the other annular area of the two sets of hole rings.

The bulk supply of articles to dispensing disc 2 is carried out by usual devices comprising a vibrating means, a hopper and a loading channel. In the example, there are shown two of such devices, having hoppers 40, 41, vibrators 42, 43 and loading channels 44, 45, respectively at the inner and outer areas with respect to the stationary wall 38 of disc 2, it being however apparent that because of the interruption in said stationary wall 38, there might be provided a single loading device in either of said areas.

The operation of the device is quite clear and apparent from the foregoing description and from diagram in FIG. 2, wherein times vs. phase of the moving members are shown during a machine cycle, i.e. a revolution of the cycle drive shaft 14.

In this diagram, the full large lines coinciding with or parallel to the respective thin base lines indicate the times of the machine cycle in degrees, whereat the respective members are dwelling, while the inclined lines indicate the movement times, still in degrees.

What is readily evident from such a diagram is, therefore, that for the 360° revolution of the cycle shaft 14, there would correspond a step of dispensing disc 2, that is one movement and one dwell, and two steps of conveyor disc 3, that is one movement and one dwell followed by a second movement and related dwell. A further significant feature pointed out by the diagram, is that relating to the movement and dwell times, respectively, of said two discs 2 and 3, intended to meet for dispensing disc 2 the requirement of conveniently accommodating the articles within holes 4, and for conveyor disc 3 the requirement relating to transferring to and withdrawing said articles from holes 5 and relative supply to the wrapping up members of the machine.

Thus, the dispensing disc will have a 120° movement time and a 240° dwell time, whereas the movement and dwell times allotted to each step of the conveyor disc are 30° and 150°, respectively.

The graphic lines for members 35, 36, 10 and 13 are as well readily representative of the functions of such members. The dashed lines, as shown, for members 35 and 36 would represent, instead, the functions of these members, where the conveyor disc overlaps the dispensing disc instead of the latter overlapping the former.

The advantages being provided by such a device to a paper-wrapping machine for sugar-drops and similar articles are apparent from the unitary output speed by using only two discs, the dispensing disc having a single-hole set, and this owing to the intermittent movements according to time differentials and some operative conditions provided for the articles to be supplied at the individual hole sets of the dispensing means.

What is claimed is:

1. A device for coordinating and separately supplying objects to a paper-wrapping machine, comprising intermittently moving unitary dispensing means acting as a bottom for an article bulk loading container and provided with holes each for receiving an article, intermittently moving unitary conveyor means provided with holes and partially overlappingly associated with said dispensing means in a transfer station for receiving objects therefrom and supplying same to said paper-wrapping machine, said holes in said dispensing means being arranged in two circularly arranged sets and the intermittent movement of the dispensing means being coordinated with the holes and intermittent movement of the conveyor means, so that at each transfer step a plurality of objects in the individual holes of said plurality of hole sets in said dispensing means pass to as many individual subsequent holes in said conveyor means, said sets of holes in said dispensing means being separated in said loading container from one another by a concentrically disposed stationary wall extending there between, which wall is interrupted in the area including the transfer station.

2. A device according to claim 1, characterized in that said stationary wall is interrupted for some length at an area not only including the transfer station of the objects from the dispensing means to the conveyor means, but also on either side thereof to enable the objects in said bulk-loading container to be transferred from an area of one set of holes to another area of the other set of holes of said dispensing means the to facilitate filling of all holes of both sets of said dispensing means.

3. A device according to claim 1, wherein the dispensing and conveyor means respectively comprise discs having two and one, respectively, rings of peripheral holes of an elongated contour, the hole rings in the dispensing means being concentric and the respective holes being arranged as substantially tangentially longitudinally extending, at right angles to the disc radius through the middle longitudinal point of the corresponding hole, whereas the holes of the hole ring in the conveyor means are arranged as substantially radially longitudinally extending.

4. A device according to claim 1, wherein the loading of the objects on the dispensing means is carried out by at least one device having at least one supply channel associated with at least one additional set of holes.

5. A device according to claim 1, comprising first feed means for supplying objects to an area of said dispensing means on one side of said stationary wall and second feed means for supplying objects to an area of said dispensing means on he other side of said stationary wall.

6. A device according to claim 2, comprising means for transferring objects from an area of said dispensing means containing one said set of holes to an area of said dispensing means containing the other said set of holes.

* * * * *